Patented May 15, 1923.

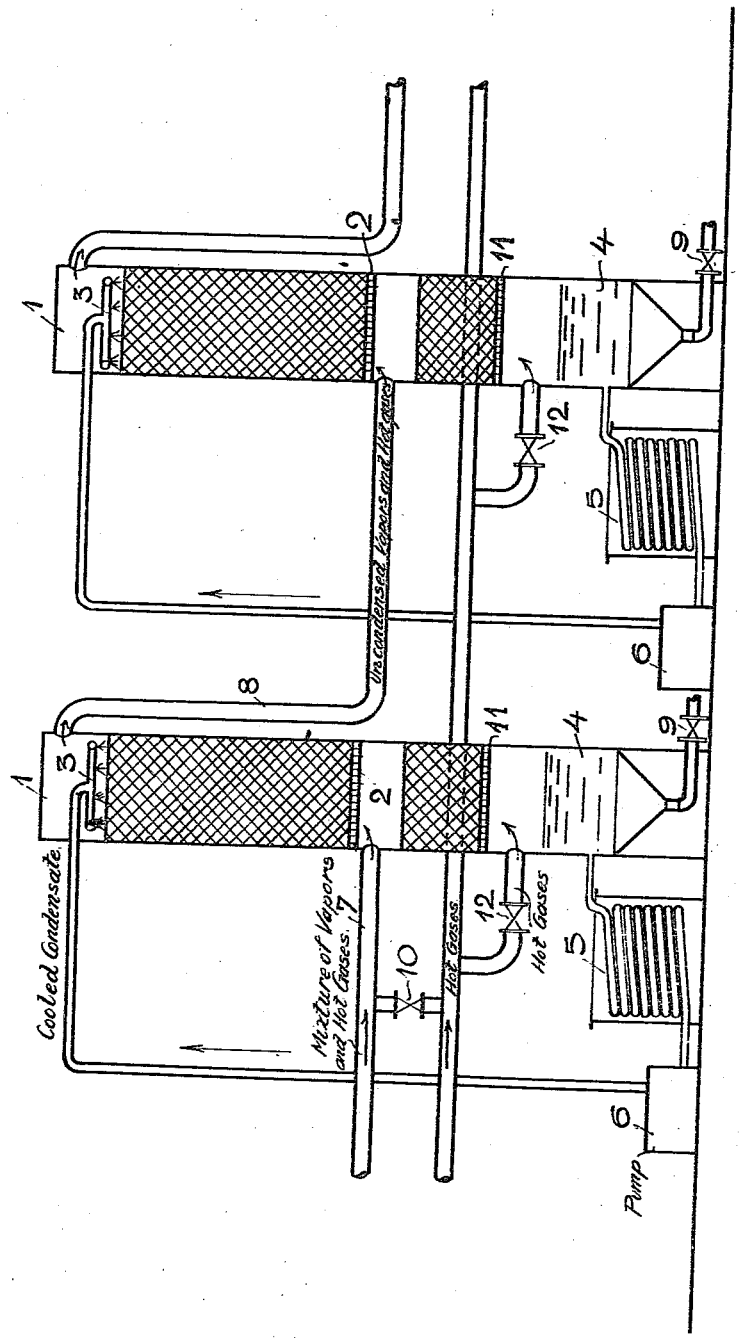

1,455,546

UNITED STATES PATENT OFFICE.

IGNACY MOSCICKI, OF LWOW, POLAND.

PROCESS OF TREATING BITUMEN OR CELLULOSE-CONTAINING SUBSTANCES.

Application filed August 25, 1921. Serial No. 495,286.

*To all whom it may concern:*

Be it known that I, IGNACY MOSCICKI, a citizen of the Republic of Poland, residing at Lwow, Poland, have invented certain new and useful Improvements in Processes of Treating Bitumen or Cellulose-Containing Substances (for which I have filed applications in Poland on September 10, 1919, and Germany on October 29, 1919), of which the following is a specification.

The greatest difficulty in the direct heating of bitumen- or cellulose-containing substances by means of hot gases, is presented by the condensation of the vapors thereby generated, and by the decomposition into fractions, owing to the necessarily required considerable dilution of the said vapors by means of permanent gases. It has now been proved by experiments that this difficulty is chiefly due to the excessively sudden cooling of the vapors in the condensing apparatus, which gives rise to the formation of mists which condense with difficulty.

The invention utilizes the results of the said experiments in the decomposition of the vapors into their component elements. According to the invention, the vapors generated by direct heating of the bitumen- or cellulose-containing substances by means of hot gases, and mixed with the said gases, are led in upward direction through a series of thermally well insulated dephlegmation columns provided with a filling material. The filling material of each column is sprinkled from the top with the condensate of the same element, which is collected directly at the bottom of the column and is cooled only to a slight extent below the temperature of condensation of the element in question. In that way, the formation of mist is prevented, and thus complete condensation of the corresponding element in the column is rendered possible.

By means of this process it is possible to produce condensation of all the ingredients of the vapor mixture, excepting the volatile elements which however can be easily separated by absorption.

The accompanying drawing is a diagrammatic, side elevation of one embodiment of an apparatus for carrying out the present invention.

Each dephlegmation column 1, 1' contains filling material resting on a grate 2. The condensate 4 collected at the bottom of the column, is cooled in a condenser 5 and pumped by means of a pump 6 into the upper part of the column into which it enters through a rose or sprayer 3 and sprinkles the filling material. The mixture of the vapors to be condensed and the hot gases pass through the pipe 7 into the column in which the vapors are partly condensed. The more volatile ingredients of the mixture pass through the pipe 8 into the next column 1' in which they are again partly condensed according to the temperature of the irrigating or sprinkling liquid, in order to pass to the next column. The excess of the condensate 4 can be discharged by means of a valve 9.

In certain cases, more particularly in the case of permanent dry distillation of wood or of coal in producers, comparatively strongly cooled vapors are obtained which carry a considerable quantity of mist produced by the liquefaction of heavy tar ingredients. Condensation of such mists presents great difficulties, so that it is necessary to use special disintegrators, which however remove the mist only in an imperfect manner.

In such cases, the process described gives the desired result if the gases and vapors passing to dephlegmation are heated to such an extent that the mist contained in the same is again converted into vapor.

To that end the best method is to supply to the vapor and gas mixtures before dephlegmation such a quantity of hot gases that the mist is converted into vapor.

With the vapors entering through the pipe 7 and carrying the mists, are mixed, through the valve 10, fresh heating gases, the temperature of which is much higher, in order to convert the mist into a vapor.

When the separation process is carried out by introducing the gas and vapor mixture close to the bottom end of the dephlegmation column, the escaping condensate, in spite of its comparatively high temperature, will still contain a fairly large quantity of lighter parts, as the partial pressures of these lighter ingredients are not high enough at this temperature.

In order completely to free the escaping condensate from the lighter ingredients, a second grate 11 with a layer of filling material can be arranged under the grate 2. The condensate trickling down can then be freed from the lighter ingredients by means of hot gases admitted through the valve 12.

What I claim as my invention and desire to secure by Letters Patent is:—

1. The process of separating vapors into their component elements, which consists in leading said vapors upwardly through a dephlegmation column adapted to partially condense said vapors and separate out a single element thereof, collecting the condensate in said column, cooling a comparatively large portion of said condensate slightly below its condensation temperature, and forcing said cooled condensate into the upper part of the column.

2. The process of separating vapors into their component elements, which consists in adding hot gases to said vapors and leading them upwardly through a dephlegmation column adapted to partially condense said vapors and separate out a single element thereof, collecting the condensate in said column, cooling a comparatively large portion of said condensate slightly below its condensation temperature, and forcing said cooled condensate into the upper part of the column.

3. The process of separating vapors into their component elements, which consists in leading said vapors upwardly through a dephlegmation column adapted to partially condense said vapors and separate out a single element thereof, introducing hot gases to said column below the admission point of the vapors, collecting the condensate in said column, cooling a comparatively large portion of said condensate slightly below its condensation temperature, and forcing said cooled condensate into the column at the upper part thereof.

4. The process of separating vapors into their component elements, which consists in adding hot gases to said vapors and leading them upwardly through a dephlegmation column adapted to partially condense said vapors and separate out a single element thereof, introducing hot gases to said column below the admission point of the vapors, collecting the condensate in said column, cooling a comparatively large portion of said condensate slightly below its condensation temperature, and forcing said cooled condensate into the upper part of the column.

5. The process of treating vapors thereby to separate said vapors into their component elements, which consists in leading the vapors upwardly through successive dephlegmation columns each adapted to separate out a single element, collecting the condensate in each of said columns, cooling a comparatively large portion of said condensate slightly below its respective condensation temperature, and forcing said cooled condensates into the upper parts of their respective columns.

In testimony whereof I have affixed my signature in the presence of the two witnesses.

IGNACY MOSCICKY.

Witnesses:
ZENON MARDYUSWICZ,
S. BORZUCHWICZ.